No. 736,054. PATENTED AUG. 11, 1903.
O. H. ARNO & J. C. HAGEY.
ORGAN.
APPLICATION FILED NOV. 23, 1901.
NO MODEL. 11 SHEETS—SHEET 2.

No. 736,054. PATENTED AUG. 11, 1903.
O. H. ARNO & J. C. HAGEY.
ORGAN.
APPLICATION FILED NOV. 23, 1901.
NO MODEL. 11 SHEETS—SHEET 5.

WITNESSES:
INVENTORS:

No. 736,054. PATENTED AUG. 11, 1903.
O. H. ARNO & J. C. HAGEY.
ORGAN.
APPLICATION FILED NOV. 23, 1901.
NO MODEL. 11 SHEETS—SHEET 6.

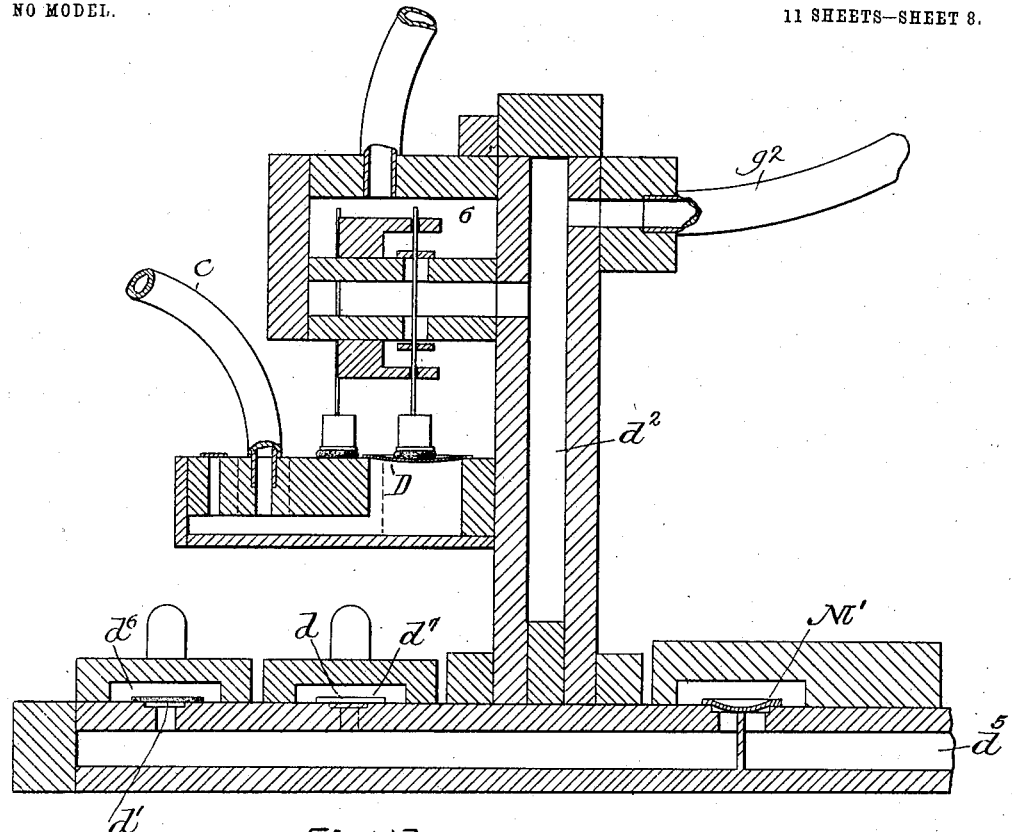

No. 736,054. PATENTED AUG. 11, 1903.
O. H. ARNO & J. C. HAGEY.
ORGAN.
APPLICATION FILED NOV. 23, 1901.
NO MODEL. 11 SHEETS—SHEET 9.

No. 736,054. PATENTED AUG. 11, 1903.
O. H. ARNO & J. C. HAGEY.
ORGAN.
APPLICATION FILED NOV. 23, 1901.
NO MODEL. 11 SHEETS—SHEET 10.
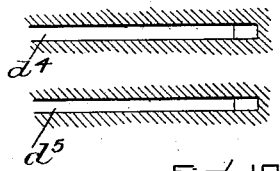
Fig. 19.
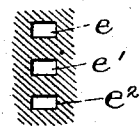
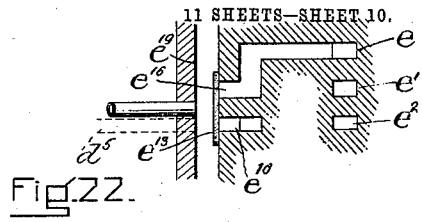
Fig. 22.
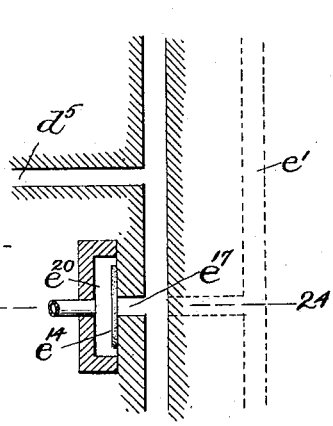
Fig. 20.
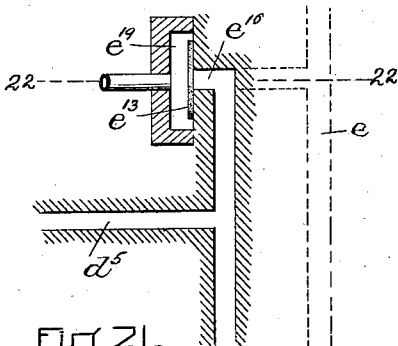
Fig. 21.
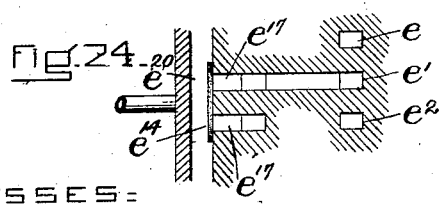
Fig. 23.
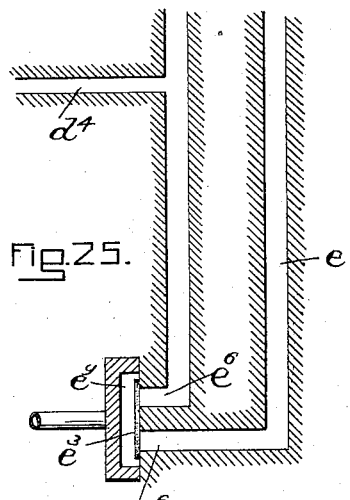
Fig. 25.
Fig. 24.
Witnesses:
Inventors:

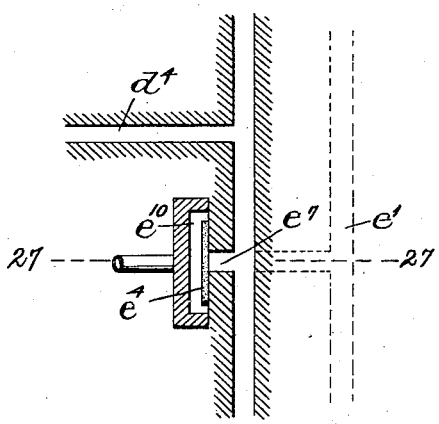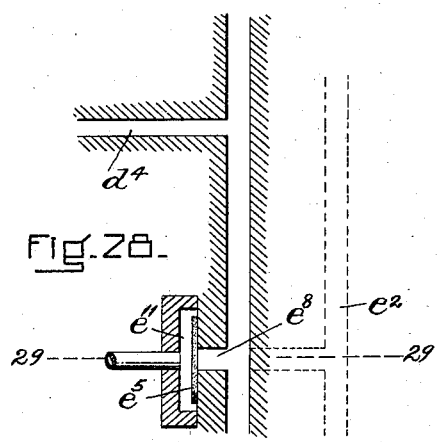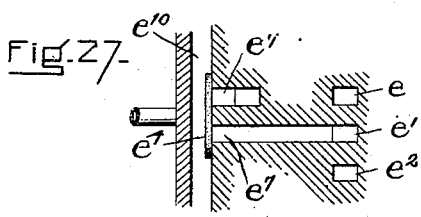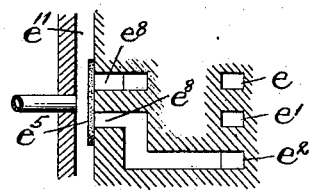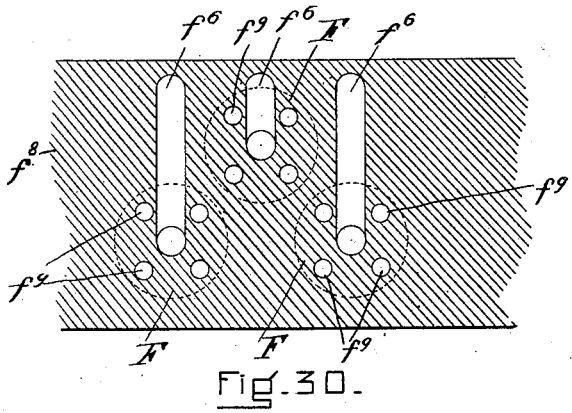

No. 736,054. Patented August 11, 1903.

UNITED STATES PATENT OFFICE.

OLIVER HILTON ARNO AND JAMES CLARKE HAGEY, OF BOSTON, MASSACHUSETTS.

ORGAN.

SPECIFICATION forming part of Letters Patent No. 736,054, dated August 11, 1903.

Application filed November 23, 1901. Serial No. 83,448. (No model.)

*To all whom it may concern:*

Be it known that we, OLIVER HILTON ARNO and JAMES CLARKE HAGEY, citizens of the United States, residing at Boston, in the county of Suffolk and State of Massachusetts, have invented a new and useful Improvement in Organs, of which the following is a full, clear, and exact description, reference being had to the accompanying drawings, forming a part of this specification, in explaining its nature.

The invention is represented as embodied in an organ, either reed or pipe, adapted to be self-playing and also to be hand-played at will.

It consists in means whereby when automatically played individual or solo notes may be automatically selected from accompaniment or other notes and may be played upon such part of the organ as may be desired for the purpose of producing a solo and accompaniment effect.

It further consists in the specific means employed for obtaining this result, for combining the manual and self-playing sections of the instrument, for coupling the manuals or organs where two or more are used, and in various other features of construction and organization, which will hereinafter be fully described.

Figure 10:
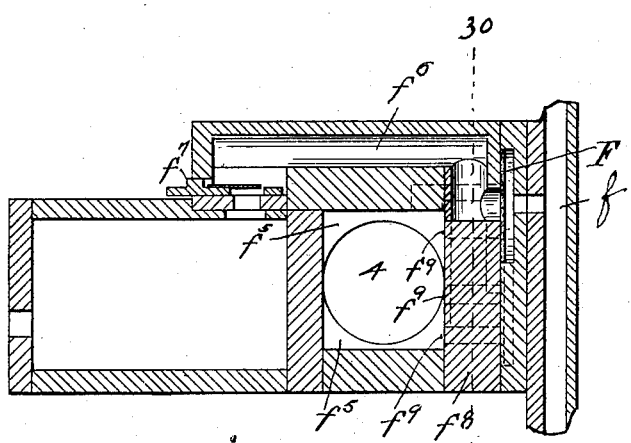
Figure 11:
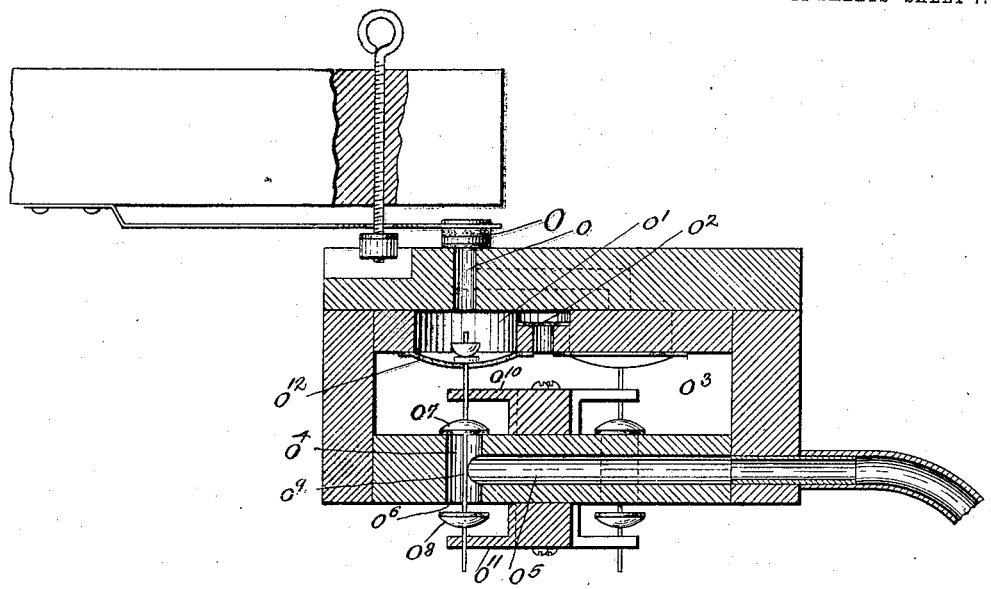

In Figures 1 to 9, inclusive, the invention is represented as applied to a reed organ having three manuals or banks of keys, known as the "swell," the "great," and the "choir." Figs. 10 and 11 represent a modification of the invention, to which reference is hereinafter made.

A self-playing music-sheet similar to that described in the patent to J. W. Crooks, No. 671,691, dated April 9, 1901, or other music-sheet containing a line of independent selecting or individualizing perforations along one edge or otherwise disposed is used for governing the automatic playing of the organ.

The tracker-board which we prefer to employ has a channel in addition to the note-channels, which we have called a "selecting" or "governing" channel and which is used in conjunction with the additional selecting or governing perforation of the music-sheet.

The apparatus has solo and accompaniment stops for each organ, a pneumatic-to-manual stop, key-coupler stops, and various other stops for controlling the playing of the reeds.

The air-pressure, or "wind" as it is commonly called, for operating the various mechanisms is obtained from any suitable source of supply, and is distributed to the channels, diaphragm and valve chambers, reeds, &c., to be described, by means of suitable trunks, tubes, and conduits.

We will now describe the invention in connection with the drawings, wherein—

Figure 1:
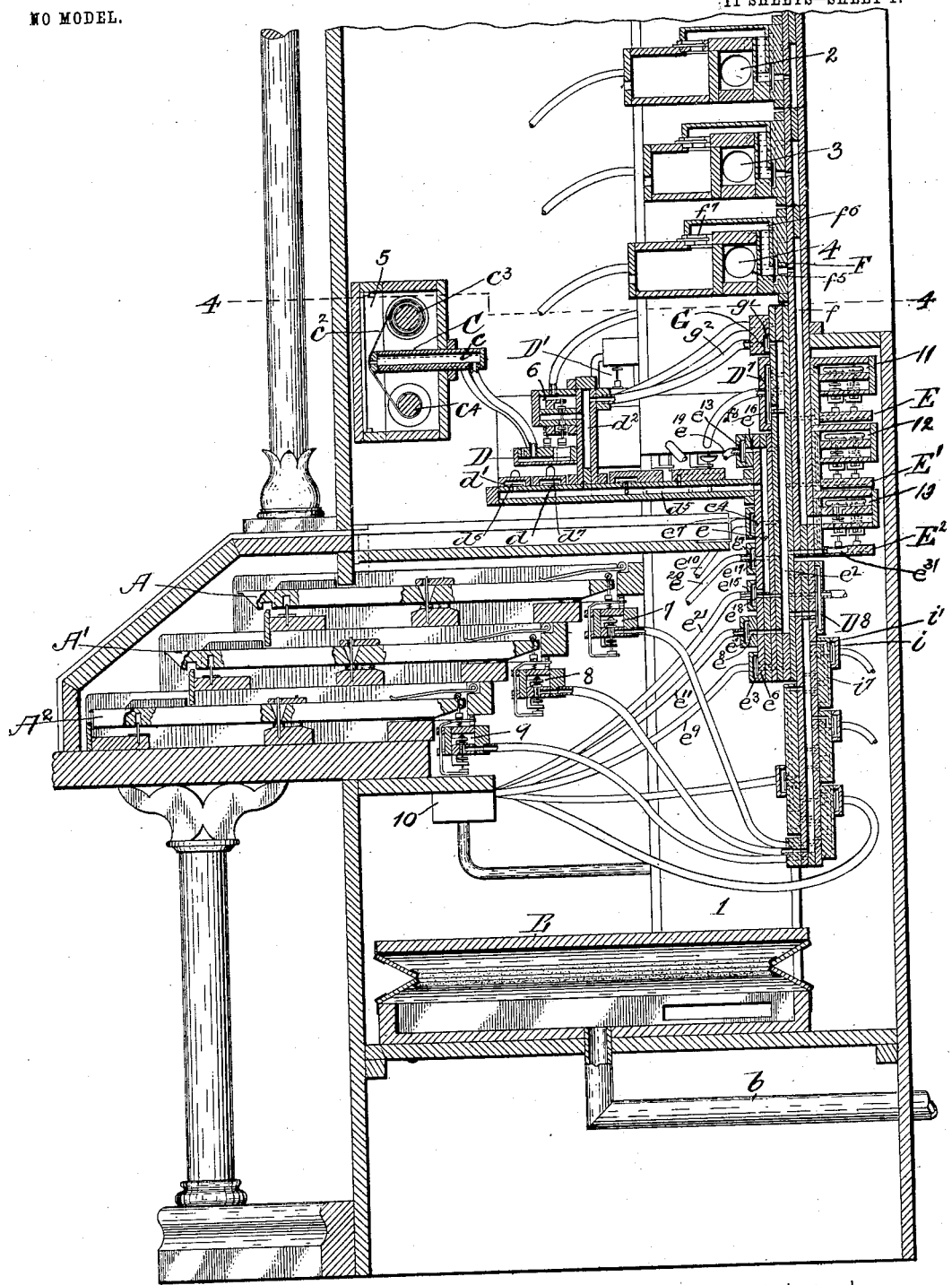
Figure 2:
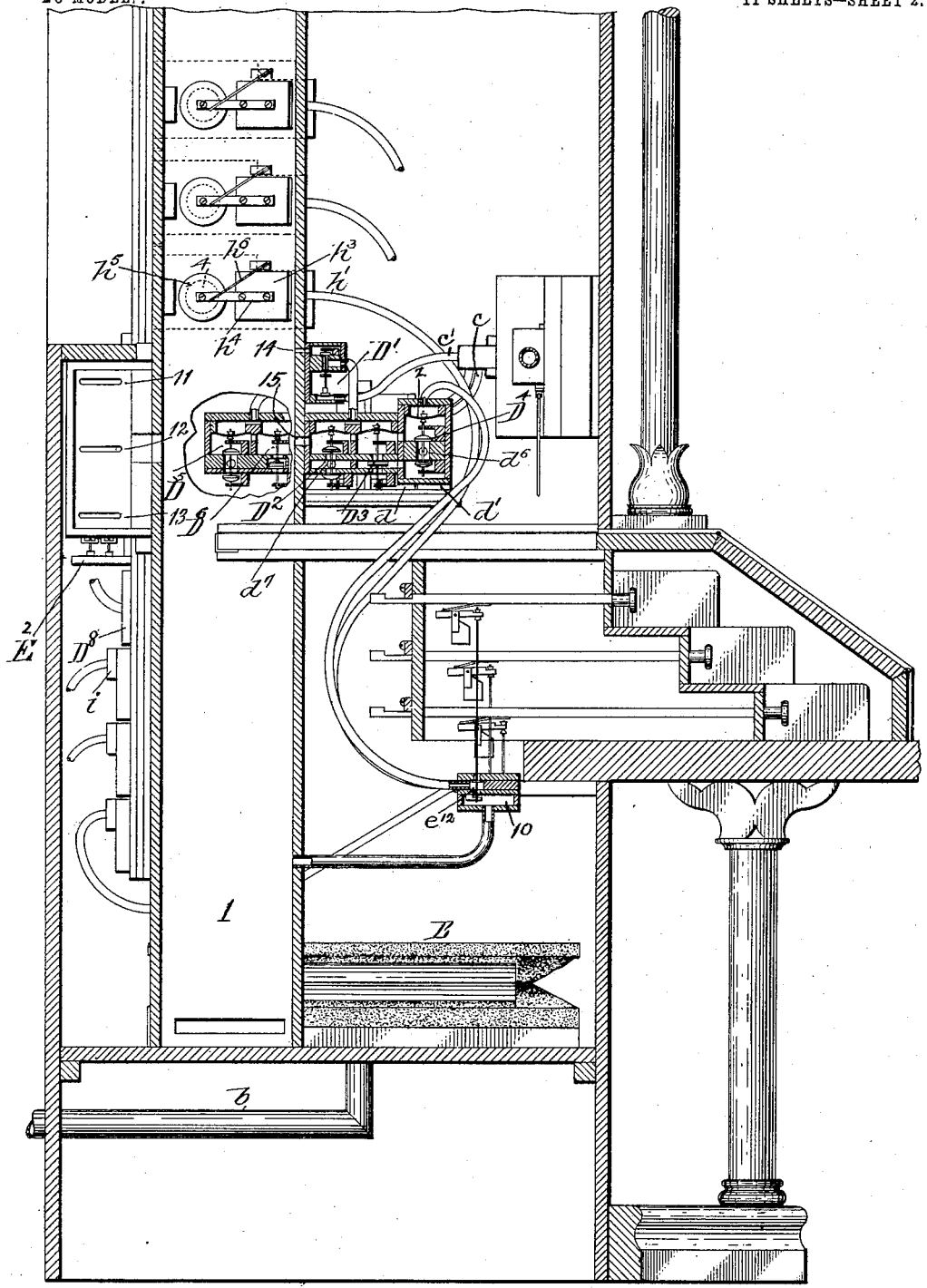
Figure 3:
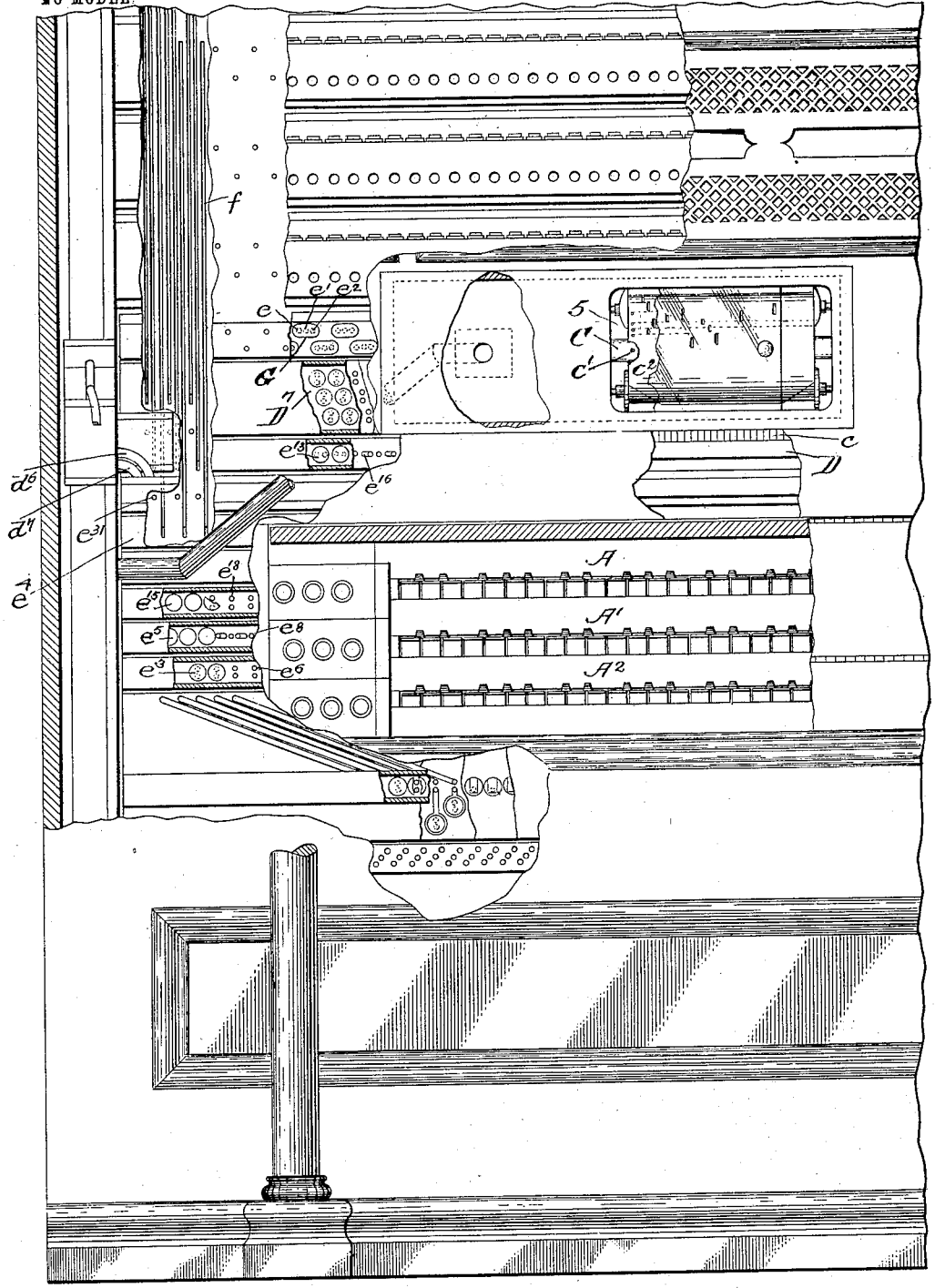
Figure 4:
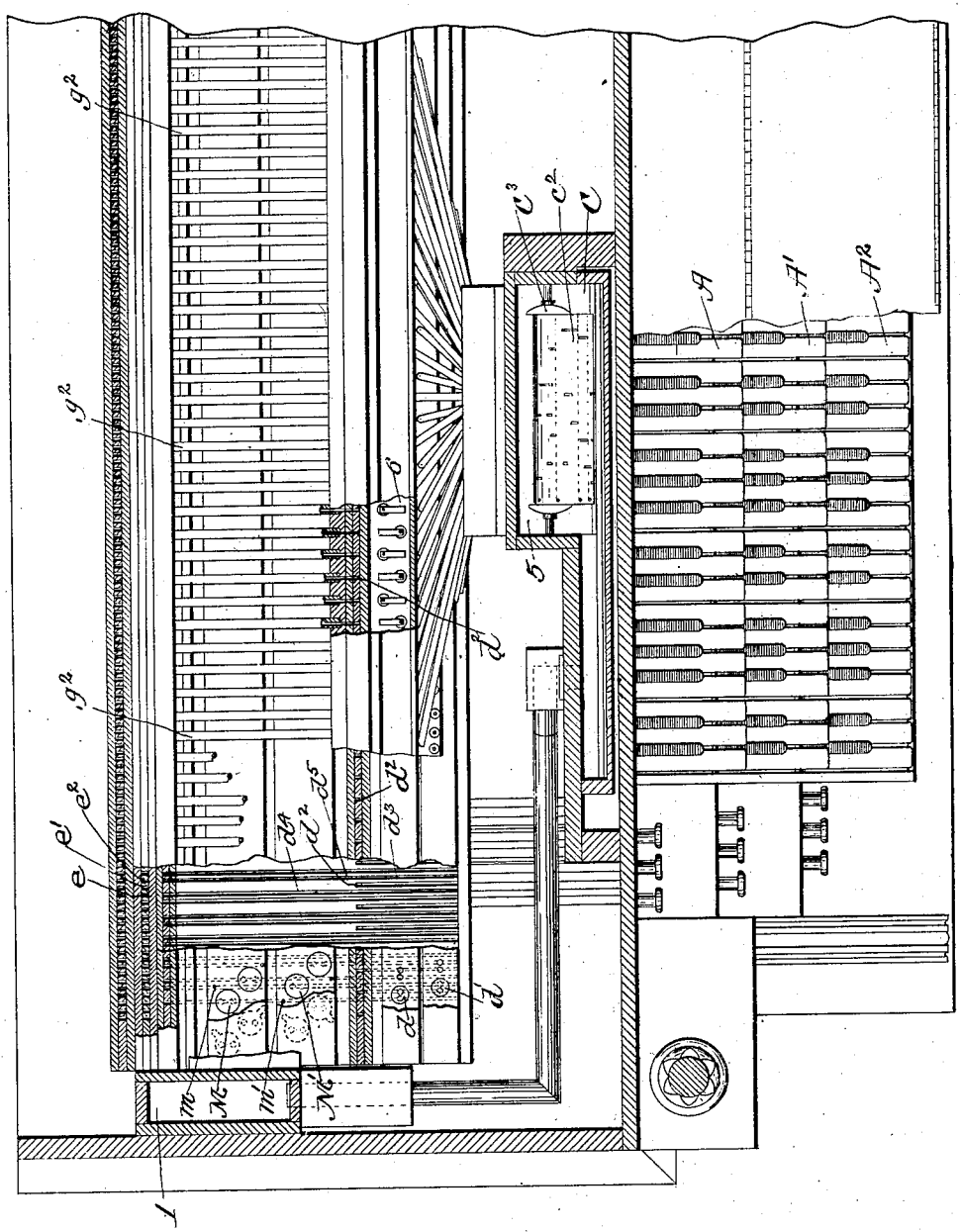
Figure 5:
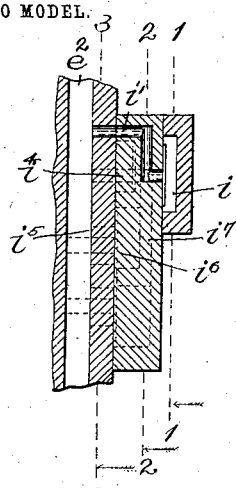
Figure 6:
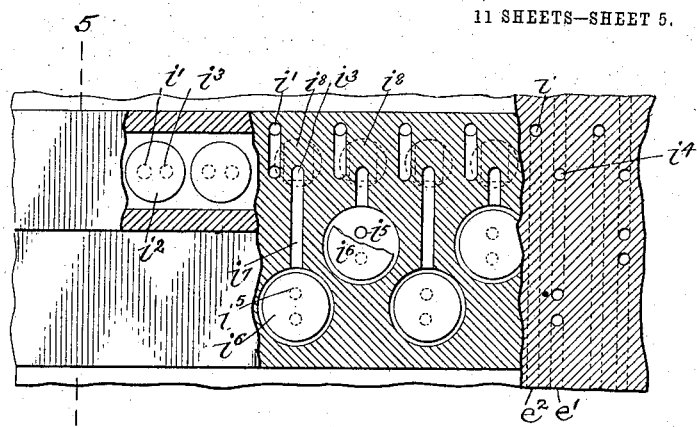
Figure 7:
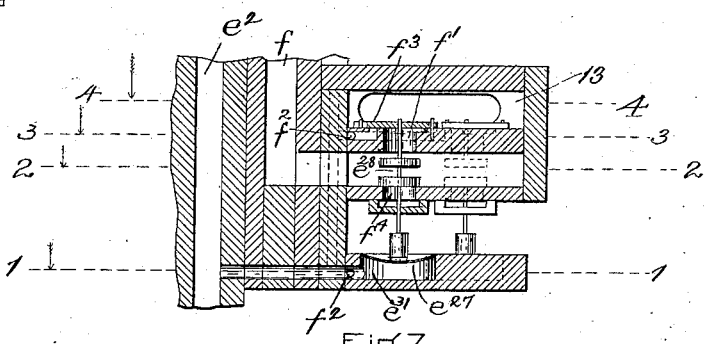
Figure 8:
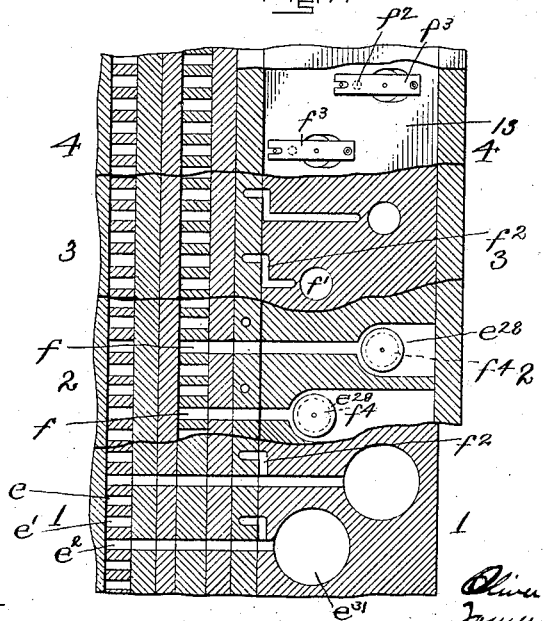
Figure 7:
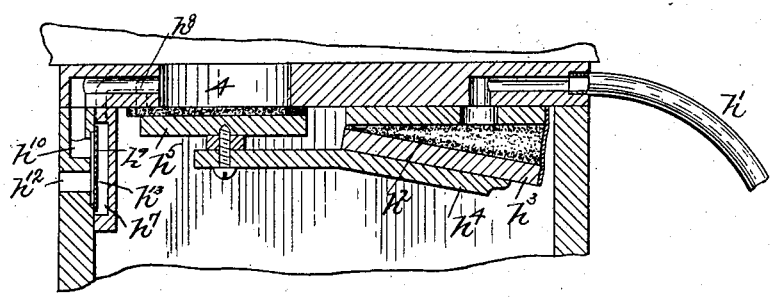
Figure 12:
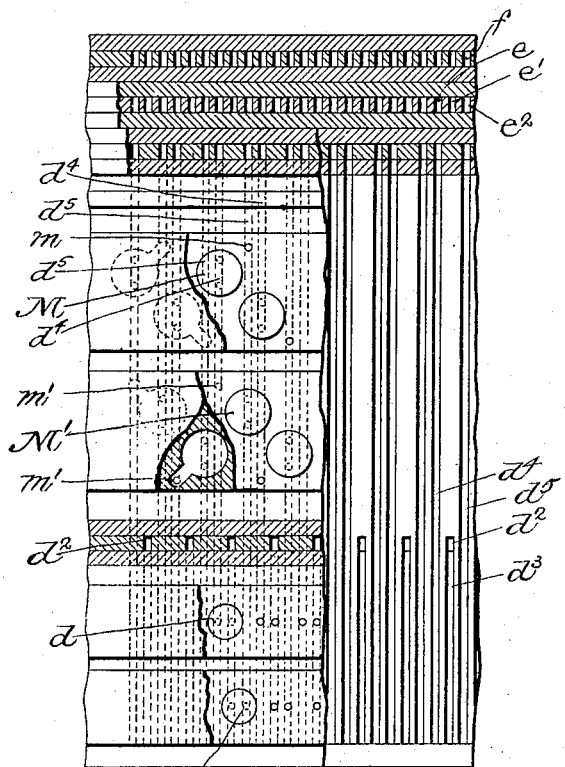
Figure 17:
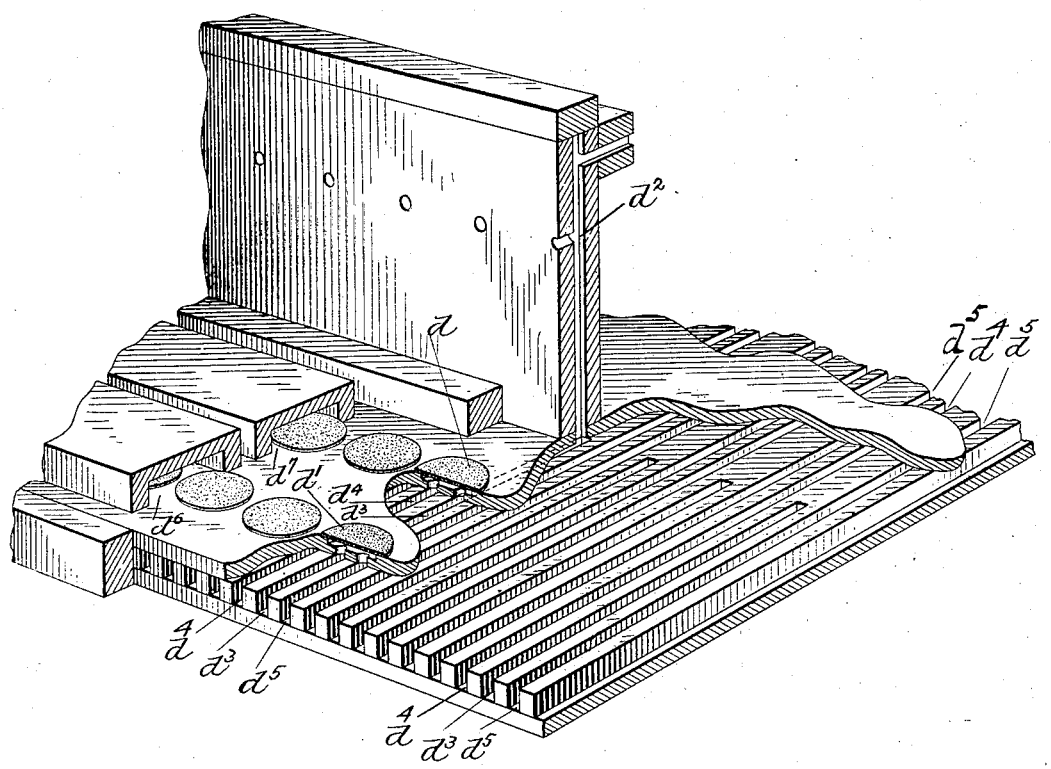
Figure 18:
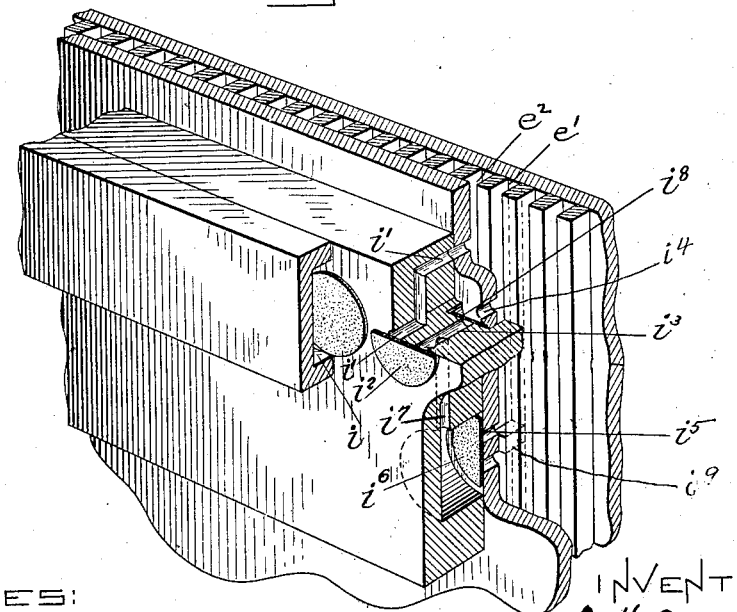

Fig. 1 is a view, principally in vertical section, of enough of the organ to show the principal parts of our invention. Fig. 2 is a view, largely in left elevation, of the mechanism at the bass end of the organ, the end of the case and the outer wall of the main wind-trunk at that end being removed. Fig. 3 is a view, mainly in front elevation, of the bass end of the organ, parts being broken out to better show the mechanism which would otherwise be concealed. Fig. 4 is a view of the organ in horizontal section upon the dotted line 4 4 of Fig. 1. Fig. 5 is a view, enlarged, in vertical section, upon the dotted line 5 5 of Fig. 6. Fig. 6 is a detail view, enlarged, of a coupler for coupling two manuals together when the organ is being manually played, the sections being upon the dotted lines 1 1, 2 2, and 3 3 of Fig. 5. Fig. 7 is a detail view, in vertical section, enlarged, of the secondary pneumatics and valves. Fig. 8 is a detail view, enlarged, on the horizontal sections 1 1, 2 2, 3 3, and 4 4 of Fig. 7. Fig. 9 is a detail view, enlarged, in horizontal section to illustrate a reed draw-stop pneumatic and valve. Fig. 10 is a detail view, in vertical section, enlarged. Fig. 11 is a view, enlarged, representing the form of key primary valve which we prefer to use. Fig. 12 is a view, enlarged, principally in plan and section, to better illustrate some of the channels and passages to which reference is hereinafter made. Fig. 13 is an enlarged view of the primary diaphragm-pneumatic, with its associated parts. Figs. 14, 15, and 16 are enlarged sectional details showing the connections between certain passages by means of valves of peculiar construction, described below. Figs. 17 and 18 show details, in perspective, enlarged, of various passages and valves and their relation to each other, as described below. Fig. 19 is a view, enlarged, principally in horizontal section, and it shows the location of the passages $d^4$ $d^5$, hereinafter referred to, with respect to the channels $e$ $e'$ $e^2$, without, however, indicating the connections. Fig. 20 is a view, principally in vertical section, taken through the passage $d^5$ and channel $e^2$ and showing the connection between said passage and said channel. Fig. 21 is a view, partly in vertical section and partly in dotted outline, showing the connection between the passage $d^5$ and the channel $e$. Fig. 22 is a view, principally in horizontal section, upon the dotted line 22 22 of Fig. 21, to further illustrate this connection. Fig. 23 is a view in vertical section and in dotted outline to represent the connection between the passage $d^5$ and the channel $e'$. Fig. 24 is a view in horizontal section upon the dotted line 24 24 of Fig. 23 to further illustrate this connection, Figs. 20 to 24, inclusive, showing the connections between the passage $d^5$ and the channels $e$ $e'$ $e^2$. Fig. 25 is a view in vertical section, taken through the passage $d^4$ and the channel $e$, representing in full lines the connection between the two. Fig. 26 is a view in vertical section and in dotted outline of the passage $d^4$ and the channel $e'$, showing the connection between them. Fig. 27 is a view in horizontal section upon the dotted line 27 27 of Fig. 26. Fig. 28 is a view in vertical section and dotted outline of the passage $d^4$ and channel $e^2$, showing the connection between them; and Fig. 29 is a view in horizontal section upon the dotted line 29 29 of Fig. 28, still further illustrating the connection, and Figs. 25 to 29, inclusive, showing the connections between the passage $d^4$ and the channels $e$ $e'$ $e^2$. Fig. 30 is a vertical section across the reed-box of Fig. 10, enlarged, and upon the dotted line 30 30 of Fig. 10 to show the relation between the inlet-ports and outlet-port of each reed-valve.

Referring to the drawings, in Fig. 1, A represents the bank of keys called the "swell," A' the bank called the "great," and A² the bank called the "choir." The organ has, of course, the necessary stops for its actuation, including a solo or individualizing stop for each bank, an accompaniment-stop for each bank, a pneumatic-to-manual stop, the usual reed draw-stops, and coupler-stops.

B, Fig. 1, is the wind-reservoir or bellows, which receives wind under pressure from any suitable source through the inlet-pipe $b$ and holds it under pressure for distribution to the main wind-trunks and other conduits or passages of the apparatus, which preferably open from or connect with the main wind-trunks. There are two of these trunks, one at each end of the organ. One only is shown. It is numbered 1. They connect the bellows or reservoir with the swell, great, and choir reed-boxes 2, 3, and 4. (See Fig. 1.) The trunks supply wind, by means of suitable connecting tubes or conduits, to the wind-chamber 5 of the music-box, the wind-passage 6 of the primary pneumatics, the wind-passages 7, 8, and 9 of the manually-operated valves of the three manuals A, A', and A², the wind-passage 10 of the draw-stop valves, the wind-passages 11, 12, and 13 to the reed-valve channels and controlled by the valves of the secondary pneumatics, the passage 14 (see Fig. 2) to the primary individualizing-valve, the passage 15 to the secondary individualizing-valves and to one of the valves controlled by the pneumatic-to-manual stop, and to a passage (not shown) connecting the trunk with the second and third pneumatic-to-manual valves.

C, Fig. 1, is the tracker-board partly contained in the music-chamber 5 and has the usual note-channels $c$ and also the solo-governing channel $c'$. (See Fig. 3.) The perforated music-sheet $c^2$ and its holding and winding spools $c^3$ $c^4$ are also contained in the chamber 5, and the music-sheet is drawn by the winding-roll over the ends of the tracker-board channels in the usual or in any desired way.

The tracker-board has a channel for each note that is played and an additional channel which governs the playing of certain or individual notes.

Each of the note-channels $c$, designed to provide a solo or give expression by introducing a quality or kind of tone varying from that of the other notes, (the unselected and selected notes being so separated and controlled,) is connected with a primary diaphragm-pneumatic, which is lettered D. The note-governing channel $c'$ is connected with a valve D', Fig. 2, which controls the operation of the individualizing-diaphragms $d$, Fig. 1, and the accompaniment-diaphragms $d'$ through the secondary individualizing-valves D² and D³. (See Fig. 2.)

The primary pneumatic D is operated when a perforation in the music-sheet permits the wind-pressure in the music-box 5 to enter a channel in the tracker-board and reach it. This wind impulse serves solely to actuate the pneumatic and to cause the valve in the primary pressure-passage 6, Fig. 1, to open a port between the primary pressure-passage and the vertical channel $d^2$, whereby wind-pressure from the passage 6 is admitted to the said vertical channel $d^2$. The pressure thus supplied the vertical channel $d^2$ continues so long as the said valve remains open, and the valve is held open by the pneumatic so long as the perforation in the music-sheet permits pressure to pass from the box 5 through a channel of the tracker-board to the pneumatic. There is a separate primary pneumatic for each note-channel.

Each of the channels $d^2$ has a horizontal extension, which is lettered $d^3$, Fig. 4 and Fig. 17, and which is only a continuation of the channel $d^2$ and is horizontally arranged for the purposes of convenience. It is connected, when permitted, by the individualizing-diaphragm $d$, Figs. 1 and 4, or the accompaniment-diaphragm $d'$ with either the individualizing-channel $d^4$, Fig. 4, or the accompaniment-channel $d^5$, the diaphragms $d$ $d'$ being automatically controlled as to their action by the absence or presence of pressure upon them, and this is provided by means of the passages $d^6$ and $d^7$, Fig. 1, which are connected by means of the valves $D'$, $D^2$, and $D^3$, Fig. 2, with the source of wind-pressure through the passage 15.

By reference to Fig. 12, where the diaphragms $d$ $d'$ are shown, it will be noted that they cover perforations leading to the channels $d^3$, $d^4$, and $d^5$, respectively. Each channel $d^3$ has two perforations, one under valve $d$, the other under the valve $d'$, and the diaphragm $d$ also closes the perforation leading to the individualizing-channel $d^4$, while the diaphragm $d'$ also closes the perforation leading to the accompaniment-channel $d^5$. The construction of these diaphragms and their operation with relation to these perforations is similar in character to the diaphragm-valves $i^2$, which closes two perforations $i'$ $i^3$, all as described hereinafter, and shown in Figs. 5, 6, and 14.

The valve $D'$ is the primary individualizing-valve and controls the operation of the secondary individualizing-valves $D^2$ and $D^3$, and in the following way: The expression or governing channel $c'$ of the tracker-board is connected by a passage with the chamber of the primary pneumatic $D'$, and when it is permitted by the music-sheet to receive pressure from the music wind-chamber 5 it serves to operate the valve of the primary pneumatic and admit wind by the supply-passage 14, Fig. 2, to the pneumatic chambers of the secondary individualizing-valves. These valves are operated simultaneously and are constructed so that one admits pressure to the accompaniment wind-passage $d^6$, Figs. 1 and 2, or relieves it of pressure, while the other relieves the solo wind-passage $d^7$ of pressure or provides it with pressure, the wind being taken from the trunk through the passage 15 and alternately supplying the passage $d^6$ or $d^7$, according as the primary valve is allowed to be actuated by the individualizing perforation and channel or is held from operation by the closing of the channel. Normally the valve $D^2$, controlling the solo-passage $d^7$, is open to admit pressure to hold the solo-diaphragms closed while the valve $D^3$ is closed to relieve the accompaniment wind-passage $d^6$ of pressure, whereby the accompaniment-diaphragms are free to operate in playing accompaniment-notes. While the wind makes direct connection through the port of the valve $D^2$ to the solo wind-passage $d^7$, it does not make direct connection through the valve $D^3$ with the accompaniment wind-passage $d^6$, but passes from the valve $D^3$ and through the pneumatic-to-manual valve $D^4$ to the passage $d^6$. The reason for this is that when the self-playing apparatus is not used it is necessary to prevent escape of wind from the solo and accompaniment channels through the open primary valves, and this is done by maintaining pressure in both the passages $d^6$ and $d^7$, whereby both sets of diaphragms $d$ $d'$ are held closed. The release of pressure in the music-box 5 which then occurs will cause the primary pneumatic $D'$, Fig. 2, to remain inactive, and thereby permit wind taken through the passage 15 to hold open the valve $D^2$ and admit pressure to the channel $d^7$.

The operation of the pneumatic-to-manual stop releases the pressure which the pneumatic $z$ of valve $D^4$, Fig. 2, receives from the wind-passage 10 and permits the pressure received by passage 15 to operate the pneumatic to move the valve $D^4$ to a position which allows pressure to enter the passage $d^6$ and cuts off the exhaust through the port beneath valve $D^3$ and permitting pressure through the channel $d^6$ to close the diaphragm $d'$. The pneumatic-to-manual stop also operates two other valves, one, the valve $D^5$, Fig. 2, to prevent the escape of wind from the wind-passages controlling the secondary valves through the exhaust-tube $g^2$, Fig. 1, to be hereinafter described, the other, the valve $D^6$, which permits connection to be made between the passages or channels of the secondary valves and the manual or key valves.

The valves $D^5$ and $D^6$, actuated by the pneumatic-to-manual stop, are constructed like the pneumatics $D^2$ $D^3$ and need not further be described, the movement of the draw-stop in one direction causing one pneumatic to close one valve and the other pneumatic to open the other, and the closing of the draw-stop reverses their action. The valve $D^5$ controls the pressure in the diaphragm valve-chamber $D^7$. The presence of pressure in this chamber closes the loop-passages, one of which (lettered $d^8$) is shown in the channel $e^2$ and beneath its controlling-diaphragm in the chamber $D^7$, between all the exhaust extensions of the secondary channels and the exhaust-passages, thereby cutting out the automatic exhaust from the secondaries when the organ is being played manually. The release of the pressure in this diaphragm-chamber permits the normal connections with the exhaust to be resumed. The valve $D^6$ controls the pressure in the diaphragm valve-chamber $D^8$. The presence of pressure in this chamber causes the diaphragms to close loop-passages between the manual extensions of the secondary channels and the channels connected with the manual primaries, so that pressure may not escape through the manual primaries while the instrument is being automatically played. The release of pressure in this diaphragm valve-chamber permits connection to be made between the manual primaries and their secondaries.

It will thus be seen that all the channels $d^2$, Fig. 1, $d^3$, Fig. 4, are common to both individualizing and accompaniment pressure impulses and that whether such impulses shall actuate individualizing-notes or accompaniment-notes depends upon the controlling and separating diaphragms $d\,d'$, Figs. 1, 4, and 17, which are actuated or held from actuation by the primary individualizing-valve $D'$, Fig. 2, controlled as to its action by the individualizing-passage of the tracker-board.

We would here remark that each of the two passages $d^6\,d^7$ is common to all the accompaniment or the individualizing controlling-diaphragms and pressure is present in or absent from either as a whole, so that all the controlling-diaphragms of each passage are either dormant under the influence of the common pressure or permitted to be active because of its absence.

When accompaniment-notes are played, the individualizing-primary is not actuated, and the normal condition of the passages $d^6$ $d^7$ is that of pressure in the solo-passage $d^7$ and the absence of pressure in the accompaniment-passage $d^6$. The wind is then free to pass from the channels of the tracker-board to the primary pneumatics for the actuation of the valves to permit air to pass from passage 6 through the channels $d^2$, Fig. 1, $d^3$, Fig. 4, past the diaphragm $d'$ to the accompaniment-channels $d^5$, Fig. 4, and thence, as will hereinafter be explained, to the secondary pneumatics. When an individualizing or solo note is to be played, the governing-perforation of the music-sheet, which controls the playing of the note, permits pressure to pass through the individualizing-channel of the tracker-board to the individualizing-primary $D'$, Fig. 2, and causes it to operate the secondary individualizing-valves $D^2\,D^3$, reversing the positions of each, and thus admitting pressure to the accompaniment-passage $d^6$, permitting the exhaust of pressure from the solo-passage $d^7$. This closes and holds closed the diaphragms $d'$, connecting the channels $d^2\,d^3$ with the accompaniment-passage $d^5$, and leaves the diaphragms $d$ free to connect said channels $d^2\,d^3$ with the solo or individualizing channels $d^4$, (see Fig. 4,) so that a solo-note may be operated. Actuating the primary then causes wind to enter the channels $d^2\,d^3$ and pass diaphragm-valve $d$ into the solo-channel $d^4$. We would say at this point that the duration of individualizing pressure thus obtained is sufficient to actuate a secondary pneumatic, but is so quickly released that pressure taken from another source is employed for maintaining the secondary pneumatic in its operative position during the continuance of the note. Each individualizing-channel $d^4$, Fig. 4, and each accompaniment-channel $d^5$ are connected at will with the three passages $e, e'$, and $e^2$, which respectively lead to the secondary pneumatics E, E', and E². These passages $e, e'$, and $e^2$ are the means whereby either the wind impulse for an individualizing-note or the wind impulse for an accompaniment-note is delivered to a secondary pneumatic of either the swell, great, or choir division of the organ.

It should be understood that there are three separate secondary pneumatics for each note-channel of the tracker-board. These are arranged in lines, one line connecting with the reed-box valve of the swell-division, another line with the reed-box valve of the great-division, and the third line connecting with the reed-box valve of the choir-division.

Each line of secondary pneumatics is brought into action or held from action by means of draw-stops, which are hand-actuated and which permit the individualizing-notes and the accompaniment-notes to be played at the same time upon the reeds of any one of the three divisons, swell, great, and choir, or any number of them. Usually the individualizing-notes will be played upon one of the three divisions, while the accompaniment is being played upon the other two or either of them.

It should be understood that each of the channels $e\,e'\,e^2$ is connectible with an individualizing-passage $d^4$ and an accompaniment-passage $d^5$, there being one group of these channels $e\,e'\,e^2$ for each pair of passages $d^4\,d^5$ and for each note played. Each individualizing-passage $d^4$ is connectible with the channels $e\,e'\,e^2$ by cross connections, which are controlled by the diaphragm-valves $e^3\,e^4\,e^5$, (see Figs. 1 and 3 and also Figs. 25 to 29, inclusive,) which may be termed "individualizing" stop-valves.

In Fig. 3 the location of the diaphragm-valve is shown only by its casing $e^4$. It is, however, like in construction the diaphragm-valves $e^3\,e^5$. These valves control, respectively, the cross connections $e^6\,e^7\,e^8$, connecting each individualizing-passage $d^4$, respectively, with its group of channels $e\,e'\,e^2$, (see Figs. 25 to 29, inclusive,) and they are arranged in horizontal series. Each series of valves is normally held closed by pressure common to all the valves of the series and are caused to be operated upon the release of this pressure by pressure in the passage $d^4$. The valve-closing pressure is obtained by means of the valve-chambers $e^9\,e^{10}\,e^{11}$, the valve-chamber $e^9$ being common to all the diaphragm or stop valves $e^3$, the valve-chamber $e^{10}$ being common to all the diaphragm or stop valves $e^4$, and the valve-chamber $e^{11}$ being common to all the diaphragm or stop valves $e^5$. Each of these valve-chambers $e^9$ $e^{10}\,e^{11}$ is connected with and receives pressure from the draw-stop-valve box 10 and is controlled by a draw-stop. The drawing of a stop serves to release the wind from the chamber which it controls and permits the valves of such chamber to be operated.

$e^{12}$, Fig. 2, is the draw-stop valve controlling the pressure in valve-chamber $e^9$. The other draw-stop valves for the valve-chambers $e^{10}$ $e^{11}$, respectively, are not shown. They are similar in construction to the draw-stop valve $e^{12}$ and serve to connect the stop-valve box 10 with the valve-chambers $e^{10}$ and $e^{11}$, respectively, so that the diaphragm-valves $e^4$ and $e^5$, common, respectively, to these chambers, are also actuated, as are the valves $e^3$ of the chamber $e^9$. The draw-stops are used in the customary manner of such stops in the playing of the instrument.

The accompaniment-passages $d^5$ are connected at will with the channels $e$ $e'$ $e^2$ by means of the diaphragm-valves $e^{13} e^{14} e^{15}$, which are like the diaphragm-valves $e^3 e^4 e^5$ and may be termed "accompaniment" stop-valves and control the cross connections $e^{16}$ $e^{17}$ $e^{18}$, connecting the passages $d^5$, respectively, with the channels $e$ $e'$ $e^2$. (See Figs. 1 and 3 and also Figs. 19 to 24, inclusive.) The diaphragm or accompaniment stop-valves $e^{13}$ $e^{14}$ $e^{15}$ are arranged in horizontal series like the individualizing stop-valves $e^3$ $e^4$ $e^5$ and are contained in valve-chambers and held closed by pressure and are operated upon the release of pressure.

$e^{19}$ is the valve-chamber common to all the valves $e^{13}$, $e^{20}$ is the valve-chamber common to all the valves $e^{14}$, and $e^{21}$ is the valve-chamber common to all the valves $e^{15}$. (See Figs. 19 to 24, inclusive.) Each of these valve-chambers receives wind from the draw-stop-valve box 10. A draw-stop valve similar to the draw-stop valve $e^{12}$ of Fig. 2 is employed for each valve-chamber and controls the operation of all its stop-valves. By these cross connections and valves the solo-passage $d^4$ and the accompaniment-passage $d^5$ are each connectible at will with either of the three channels $e$ $e'$ $e^2$ of each group common to a single solo and single accompaniment channel and in any order desired or simultaneously with two or all of them, according as the draw-stops controlling the actuation of the valves are drawn, it being understood that there are six draw-stops for this purpose, one for each series of diaphragm-valves $e^3$ $e^4$ $e^5$ and $e^{13}$ $e^{14}$ $e^{15}$, one set of draw-stops controlling the connection of all the solo-passages $d^4$ with the three organs and the other set of draw-stops controlling the connection of all the accompaniment-passages $d^5$ with the three organs. The location of the connection between the solo-passage $d^4$ and the channel $e$ and that of the valve controlling the connection are represented in Fig. 25. The location of the connection between the solo-passage $d^4$ and the channel $e'$ and that of the valve controlling the connection are represented in Figs. 26 and 27. The location of the connection between the solo-passage $d^4$ and the channel $e^2$ and that of the valve controlling the connection are represented in Figs. 28 and 29. The location of the connection between the accompaniment-passage $d^5$ and the channel $e$ and that of the valve controlling the connection are represented in Figs. 21 and 22. The location of the connection between the accompaniment-passage $d^5$ and the channel $e'$ and that of the valve controlling the connection are represented in Figs. 23 and 24. The location of the connection between the accompaniment-passage $d^5$ and the channel $e^2$ and that of the valve controlling the connection are represented in Fig. 20.

We have now shown how the wind impulses are received by the channels $d^2$ $d^3$, diverted from them to the individualizing and accompaniment channels, and from them at will delivered to the secondary pneumatics of any one or more of the three divisions of the organ. There are two other sets of valves which affect the delivery of these impulses, which we have termed "automatic cut-offs." One set is located in the accompaniment-channels $d^5$ and the other in the solo-channels $d^4$, and each valve of each set is connected with the passage of the other, whereby it is caused to be actuated by pressure therein. The cut-off valve in the solo-channel we have lettered M, and the cut-off valve in the accompaniment-channel is lettered M'. The channel connecting the accompaniment-channel with the valve M of the solo-channel is lettered $m$, and the channel connecting the solo-channel with the accompaniment-valve M' is lettered $m'$. These valves are not operated in lines, but individually by pressure in one or the other of the two channels. To understand the use of these valves, it should be borne in mind that an individualizing-perforation of the music-sheet permits what be termed an "instantaneous action" of the solo or individualizing diaphragm-valves $d$, and the passing of the perforation away from the individualizing-channel immediately restores the pressure to the solo-passage $d^7$ and to the individualizing diaphragm-valves $d$ and releases it from the accompaniment-passage $d^6$ and its diaphragm-valves $d'$. Therefore the pressure permitted by the acting note-perforation of the sheet which had been individualized would then pass by the valve $d'$ into the accompaniment-channel, and thus actuate an accompaniment-note To prevent this action, we have employed the valve M' and have caused it to be actuated by the invidualizing puff or pressure as it passes through the individualizing-channel $d^4$, the pressure simultaneously passing by the passage $m'$ to the diaphragm-valve M' and closing it. This closing pressure is maintained on the valve during the playing of the individualizing-note by back pressure from the secondary pneumatic through the channel $d^4$ to the valve M'. After the note has been played the back pressure is removed, the valve M' thus released, and the accompaniment-note may then be played.

To permit of the playing of a sustained accompaniment-note, it is necessary that the solo-channel of that note should be held closed without interfering with the playing of other solo-notes, and this is accomplished by closing the solo-channel $d^4$ by means of the diaphragm-valve M, the continued pressure in the accompaniment-channel $d^5$ by means of the channel m also serving to maintain the valve M closed so long as the note is played. The valve M is then released. Without these automatic cut-off valves the individualizing-notes would not be sharp, sustained, and well defined and the accompaniment and solo notes would not be held separate throughout their length.

All of the secondary pneumatics have the same construction which will be described in detail hereinafter, and each comprises a pneumatic $e^{27}$, Fig. 7, which actuates a valve $e^{28}$, which controls the pressure in a passage $f$, extending to a reed-valve F. (See Fig. 1.) The presence of wind in this passage closes the reed-valve and holds it closed. Its absence permits the reed-valve to be blown open, permitting the wind to pass the valve from the reed-box and actuate the reed. The actuation of the pneumatic $e^{27}$ causes the valve $e^{28}$ to close the port $f'$ and to open the port $f^4$, which connects the passage $f$ to the outer air, so that pressure in the passage $f$ may then escape and the reed-box valve be thus released from pressure and permitted to be operated. A by-passage $f^2$ extends from the wind-passage 13 to the pneumatic-chamber $e^{31}$ or to a passage in it. It is controlled by the pallet-valve $f^3$ in said passage 13. The passage is closed when the pneumatic $e^{27}$ is dormant. Upon the operation of the pneumatic to play a note and upon the release of pressure from the passage $f$ the pallet-valve $f^3$ is lifted, permitting pressure from the passage 13 to pass to the pneumatic-chamber $e^{31}$, sustaining the pressure received, and thus insuring a continuance of its operation. The pressure thus delivered to the chamber also maintains the back pressure in the channel, which serves to keep closed during the playing of the note the valve M', Fig. 4. Upon the release of pressure in the pneumatic-chamber the valve $e^{28}$ returns to a position which connects the passage $f$ with the pressure-passage 13 and which permits the pallet-valve to close the by-passage $f^2$. This by-passage is employed to sustain the pressure impulse, which is delivered by the passage $d^2$ upon the actuation of the individualizing-valve by the expression-actuating channel.

The reed-valve F upon release of pressure permits wind to flow from the wind-supply passage $f^5$ through a passage $f^6$ to a reed $f^7$, thus actuating the reed. (See Figs. 1 and 10.) We prefer the construction of reed-valve like that shown in Figs. 1, 10, and 30, having a head provided with a number of holes extending from the reed-box to the valve-chamber and surrounding the outlet-passage from the valve-chamber to the reed. (See Fig. 10, where $f^8$ is the head, $f^9$ represents the various inlet-ports to the chamber beneath the diaphragm or reed valve, and $f^6$ is the outlet-passage from beneath the diaphragm to the reed, the said passage turning at an angle in the head to permit it to extend about the reed-box.)

Thus far the wind-pressure for actuating the various devices has been used in the following way: first, wind taken from the music-box to actuate the pneumatics of the primary valves; second, wind taken from a supply-passage through channels controlled by the individualizing and accompaniment valves to actuate the pneumatics of the secondary valves; third, wind taken through passages to control the operation of the individualizing and accompaniment valves; fourth, wind taken through passages controlled by the draw-stops to valves governing the connection of the individualizing and accompaniment channels with the secondary pneumatics of any desired organ division; fifth, wind taken from a supply-conduit by passages extending to the reed-valves and controlled by the secondary valves; sixth, wind taken for operating the reeds.

The wind for actuating the secondary pneumatics is exhausted by passages independent of the main supply-passages. It is not feasible to exhaust through them, the main supply-channel, as they are liable to be closed by either the cut-off valves or the separating-valves. We have therefore arranged for the independent passage of the exhaust to the channels $d^2$ through the tubes $g^2$. While the channel of each secondary may have its individual exhaust to the channel $d^2$, to save and simplify connections the channels of all the secondaries controlled by a single primary valve are connected at the point where they are most closely associated with a common chamber, which chamber is connected by a single tube $g^2$ with a channel $d^2$. Therefore one exhaust-channel serves three secondaries, one in each line or organ. The exhaust can take place only when there is no pressure in the channel $d^2$. To prevent pressure from the channel $d^2$ running back through the passages to the secondaries, and thus operating the secondaries, it is necessary that each of the secondary channels extending to the exhaust-chamber G should have a check-valve $g'$ to close against the end of each of said passages, and thus not only prevent the pressure from the channel $d^2$ from reaching the secondary in this way, but also preventing pressure from any one of the actuating secondaries from reaching others of the group.

The reeds are operated in sets by draw-stops. (See Figs. 2 and 9.) Each draw-stop serves to control a valve, (not shown,) a duplicate to $e^{12}$, Fig. 2, which opens or closes the passage $h'$, Figs. 2 and 9, extending from the source of wind-supply 10, Fig. 2, to the pneumatic $h^2$, Fig. 9. The pneumatic is in the form of a small bellows having a movable side $h^3$, from which extends an arm $h^4$, which carries a valve $h^5$. When there is pressure in the pneumatic $h^2$, the valve $h^5$ is closed by a spring $h^6$, thereby closing the port 4, Figs. 1, 9, and 10, which connects the trunk with the reed-box and with a set or stop of reeds.

The release of pressure in the pneumatic $h^2$ permits the pressure in the wind-trunk to operate the movable side $h^3$ to overcome the pressure of the said closing-spring $h^6$ against the valve $h^5$, and thus move the valve from the port 4 to open it. The presence of pressure in the pneumatic $h^2$ balances the pressure of the wind against it and allows the valve $h^5$ to be closed by the spring.

To operate a set of reeds, the draw-stop governing their wind-supply is pulled out or drawn, thus releasing the wind of the pneumatic $h^2$ and permitting the valve $h^5$ to be opened. The reverse movement of the stop admits pressure to the pneumatic and allows the spring $h^6$ to close the valve.

To insure quick and absolute release of pressure in the reed-box when the valve $h^5$ is closed, we have provided a relief-valve having the following construction: A valve-chamber $h^7$ receives pressure through the by-passage (shown in dotted lines) $h^8$ when the valve $h^5$ is open, and this forces the diaphragm $h^9$ in said valve-chamber against its seat and closes the outlet $h^{12}$ and holds it closed, so that pressure may not then escape from the reed-box through the relief-passage $h^{10}$ to the outlet $h^{12}$. Upon the closing of the valve $h^5$ the valve-chamber $h^7$ is relieved from pressure upon the diaphragm, and any pressure remaining in the reed-box passes through the relief-passage $h^{10}$ under the diaphragm, which it then lifts to the outlet $h^{12}$. (See Fig. 9.) The diaphragm may have a small perforation $h^{13}$, through which the pressure behind it may be released after it has been shut off by the valve $h^5$.

When it is desired to cut out the self-playing mechanism of the organ and to connect the manual, the stop which we have called the "pneumatic-to-manual" is operated, and this serves to operate the three valves which we have already described—viz., the valves $D^4$, $D^5$, and $D^6$, Fig. 2. The stop also serves at the same time to release pressure from the music-box 5 in the usual way.

The key-valves of the manuals are connected with the channels of the secondary pneumatics and serve to actuate the reeds or permit of their actuation in the same manner as though they were actuated or permitted to be actuated by the primary pneumatics of the self-playing portion of the instrument. The passages $e$ $e'$ $e^2$ are extended downward sufficiently to receive the necessary connections and the couplings to be described.

Each key operates in the same way in all the manuals. It serves upon being moved by hand to open a valve between a passage containing pressure and a passage extending from the valve to the secondary passage of its division or organ, which is a continuation of the same passage of the self-playing section and through which it reaches its secondary pneumatic. The valve we prefer to employ is like that represented in Fig. 11 and is constructed and operates as follows: The employment of separating-channels between the automatic primaries and the secondaries and the desirability of providing some means for coupling the manuals together have rendered it expedient to operate the secondaries by additional primaries common only to the keys of the manuals and which manual primaries are connected directly with the secondaries. Each key of each manual actuates a manual primary. The form of manual primary which we prefer to use is that represented in enlarged detail in Fig. 11. The manual-key of said figure is represented as having a valve O. This valve is attached to the key, preferably by a withholding-spring, and it is movable with the key. It is arranged above the outlet of an exhaust-port $o$, which extends from the pneumatic-chamber $o'$. This chamber receives equalizing pressure through the vent $o^2$ from a pressure-chamber $o^3$, which is common to all the manual-pneumatics of a single organ. This pressure-chamber $o^3$ is connected by a port $o^4$ and a passage $o^5$ with a downward extension of one of the secondary channels $e$, $e'$, or $e^2$, according to the organ which is operated. The channel $o^5$ also has the outlet-port $o^6$ to the outer air. The port $o^4$ is closed and opened by the valve $o^7$, and the port $o^6$ is opened and closed by the valve $o^8$. Both these valves are mounted upon a valve-stem $o^9$, which has bearings in the guides $o^{10}$ and $o^{11}$ and is attached to the pneumatic $o^{12}$. When the port $o$ is closed by the key-valve O, the pressure upon the pneumatic $o^{12}$ is equalized, and the valve $o^7$ then rests on its seat, closing the port between the chamber $o^3$ and the passage $o^5$. The port $o^9$ is then open, so that there is no pressure in the passage $o^5$. This is normally the inoperative position of the valve. Upon the movement of a key to play a note the key-valve O opens the port $o$ and releases the pressure over the pneumatic and permits the pressure in the chamber $o^3$ to move it upward, and thus lift the valves $o^7$ $o^8$, closing the outlet-port of the channel $o^5$ and connecting the pressure-chamber $o^3$ with it, whereby pressure is permitted to reach and operate the secondary pneumatic. When the key is permitted to return to its normal position at the end of the playing of the note, pressure upon the pneumatic becomes equalized, as above explained, and the outlet is then opened to permit the exhaust or release of pressure from the secondary pneumatic through the passage $o^5$.

To arrange all the manual primaries of a single manual upon the same line, it will be expedient to stagger the primaries, as represented in Fig. 11, in which case the ports $o$ or of such of the valves as may be more remote will be led or extended to a position to bring them in line with the line O of key-valves. By this organization there is no operative connection between the manuals and the automatic primaries. The automatic primaries are connected by the separating-channels with the secondaries of each of the two or more organs which may be employed. The keys of each manual are connected by their independent primaries with the secondaries of each organ. This organization is advantageous in that it permits of the introduction of the separating-passages between the automatic primaries and the secondaries and in that it also permits of the coupling of two or more manuals together independently of the automatic mechanism.

The various divisions of the organ when hand-played are adapted to be coupled with each other, so that two or more divisions may be simultaneously played. Each coupling connecting the divisions of the organ has the same general construction, and a description of one will answer for all. Four of these couplings are shown for making the various connections and each is controlled by a coupling-stop.

We will describe the coupler—"choir" to "great"—or that connecting the passages $e'$ and $e^2$. When the coupling-stop is operated, pressure which is contained in passage $i$, Fig. 5, is released. This permits pressure to pass from the secondary passage $e^2$, Figs. 5 and 6, of the great-organ division by means of a passage $i'$, extending to one side of the flexible diaphragm $i^2$ to a passage $i^3$, extending to a passage $i^4$, connecting with the parallel secondary passage $e'$ of the choir-division of the organ. The presence of pressure in the passage $i$ closes the diaphragm-valve $i^2$, and the presence of pressure in the secondary passage $e'$, Fig. 6, of the choir-organ closes a check-valve $i^8$ (dotted) in the passages $i^3$ and $i^4$, so that pressure from that source may not flow backward into the passage $e^2$, thereby reversing the coupling connection. Upon the passage $e'$ receiving wind from passage $e^2$ in the aforesaid manner and to prevent the escape of wind through the key-valve of passage $e'$, which as the key has not been operated is open, the loop $i^5$ comes in use. The loop is of ordinary construction and simply consists of two short lateral passages extending laterally from the passage $e'$ to the valve-chamber. As in all loops, the main passage contains the two lateral passages of the loop, which breaks the direct continuity of the passage and causes it to be affected by means of the passages of the loop, thus providing a construction which permits of the easy employment of a controlling-valve. In this instance $i^9$ represents the partition in the channel $e'$. Over and controlling this loop is placed the diaphragm-valve $i^6$, which is automatically closed and held closed by the pressure in the passage $i^3$, Figs. 5, 6, and 18, received through the passage $i^7$. Upon release of pressure in the passage $e^2$ this diaphragm is free to be acted upon and no longer serves to obstruct connection between the passage $e'$ and its controlling key-valve. This mechanism is also shown in Fig. 18.

The couplers which we have shown in Fig. 1 connect the swell to the great, the choir to the great, the swell to the choir, and the swell to great octaves. The same type of coupling as described for unisons may with a slight modification be employed for connecting any divisions or organs in octaves, in which case the passage $i'$ instead of connecting channels of the same note in the different divisions or organs is extended to connect notes an octave apart, and we have shown at X one such coupling between the swell and the great, and others may be used, if desired.

We have not described specifically a form of valve which we prefer to employ wherever it is possible and which we have used in the following places, viz: in the individualizing-passages $d^6$ $d^7$, in the automatic cut-offs M M', in the separation-passages controlled by the stops, in the automatic exhaust-passage, in the manual extension cut-off passage, in the coupler-valve passages, and in the reed-valve passages. This valve is represented in detail in Figs. 5 and 6, and it comprises generally two ports $i'$ and $i^3$, which are arranged side by side in a common head and which open into a slightly-depressed circular flat surface. Over this slight circular depression to cover these openings is arranged a thin diaphragm of leather or other suitable material $i^2$, cemented by its edge to the head bordering the depression, covering the depression and the ports, but being free to be moved in the depression. A pressure-chamber $i$, Fig. 5, connected with a source of supply, is arranged over the diaphragm. Pressure in the pressure-chamber exerted upon the diaphragm closes it upon the surface about the ports and closes the ports. The release of pressure in the pressure-chamber relieves the diaphragm of this closing pressure and permits pressure in either of the ports to lift it from them both, and thereby provide a connection between them through which pressure may flow so long as the diaphragm is relieved from the closing and holding pressure. This provides a very simple, cheap, and effective structure.

The operation of the organ is as follows: With the pneumatic-to-manual stop closed, the various wind-passages controlled by the keys are disconnected and the various wind-passages necessary for supplying the automatic mechanism are connected with it, and the instrument may then be automatically played. All the notes provided by the music-sheet actuate the primary pneumatics, and as the primary pneumatics are actuated they admit wind to channels connecting them with the secondary pneumatics. The governing-perforations determine which of two intermediate courses these note impulses shall take, and the draw-stops control the connections of each stop of reeds with either the solo-secondary or the accompaniment-secondary valve, determining which stop of reeds shall be played as solo and as accompaniment. The wind impulses permitted by the primary pneumatics are always very short for solo-notes and may be very short for accompaniment-notes. This is so when the operation of the solo-note is coincident with the operation of an accompaniment-note or a portion of it, and additional wind is then necessary for continuing the actuation of the secondary pneumatics for the duration of the notes. This additional wind is provided by back pressure admitted through $f^2$ to the secondary-pneumatic channels $e^3$ by the opening of the valves of the secondary pneumatics. The closing of the channels in the tracker-board by the music-sheet serves to release the secondary valves and permit them to close by the releasing of the primary valves, allowing the pressure to exhaust directly from the secondary channels through the direct exhaust-passages $g^2$ to the primary valves. Each primary valve has its coöperating secondary valve in each organ. In the construction shown in Figs. 1 and 2, as there are three organs therein shown there are three secondary valves for each single primary valve and each primary governs the direct exhaust of its three secondaries, the construction being such that the three channels of the secondary valves are connected or merged, so that only one direct exhaust-passage $g^2$ is needed for combining the three secondaries with their primary and also so that a common check-valve $g'$ serves to prevent reverse pressure or backflow through this exhaust-passage. When an accompaniment-note is operated without a solo-note and governing-perforation interrupting it, the impulse provided by the operation of the primary valve is coincident with the length of the note, and the secondary valve would then operate for the length of the note without the addition of back pressure, although, as a matter of fact, back pressure is always used. The solo and accompaniment notes being automatically separated may then be led to any organ or reed and controlled by stops as desired.

While we have described the invention as applied to the class of musical instruments known as "organs," we do not wish it to be understood that we limit the invention thereby, but may use as much of the invention as is applicable in musical instruments having other sounding devices than pipes or reeds and whether said devices are wind or otherwise operated.

Having thus fully described our invention, we claim and desire to secure by Letters Patent of the United States—

1. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic and a traveling music-sheet having note-playing perforations and note-individualizing perforations to coöperate with the note and individualizing channels of the tracker-board.

2. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting it with an accompaniment-channel and an individualizing-channel of the same primary pneumatic, a stop-valve for each of said connecting-channels and a traveling music-sheet having note-playing perforations and note-individualizing perforations to coöperate with the note and individualizing channels of the tracker-board.

3. In a self-playing musical instrument, the combinaiton of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting it with an accompaniment-channel and an individualizing-channel of the same primary pneumatic, a stop-valve for each of said connecting-channels, a cut-off in the accompaniment-channel and individualizing-channel and a traveling music-sheet having note-playing perforations and note-individualizing perforations to coöperate with the note and individvalizing channels of the tracker-board.

4. In a self-playing musical instrument, the combination of a tracker-board having note-channels, a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting it with an accompaniment-channel and an individualizing-channel, of the same primary pneumatic, a stop-valve for each of said connecting-channels, said sound-producing devices and a traveling music-sheet having note-playing perforations and note-individualizing perforations to coöperate with the note and individualizing channels of the tracker-board.

5. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting them with an accompaniment-channel and an individualizing-channel of the same primary pneumatic, a stop-valve for each of said connecting-channels, and independent means for maintaining and continuing the initial operating pressure upon the secondary pneumatic, and a traveling music-sheet having note-playing perforations and note-individualizing perforations to coöperate with the note and individualizing channels of the tracker-board.

6. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting it with an accompaniment-channel and an individualizing-channel of the same primary pneumatic, a stop-valve for each of said connecting-channels, independent means for maintaining and continuing the initial operating pressure upon the secondary pneumatics, a secondary-pneumatic exhaust-passage independent of the pressure-supply channel and a traveling music-sheet having note-playing perforations and note-individualizing perforations to coöperate with the note and individualizing channels of the tracker-board.

7. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting it with an accompaniment-channel and an individualizing-channel of the same primary pneumatic, a stop-valve for each of said connecting-channels, an independent relief or exhaust passage for each group of secondary pneumatics and a traveling music-sheet having note-playing perforations and note-individualizing perforations to coöperate with the note and individualizing channels of the tracker-board.

8. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary pneumatics the connection of which primary-pneumatic channel therewith is governed by the individualizing-pneumatic, two or more secondary pneumatics for each primary pneumatic controlling the operation of sound-producing devices, a branch channel for each secondary pneumatic connecting them with an accompaniment-channel and an individualizing-channel of the same primary pneumatic, a stop-valve for each of said branch channels, an automatic cut-off in the accompaniment-channel and an automatic cut-off in the individualizing-channel, independent means for maintaining and continuing the initial operating pressure upon the secondary pneumatics in the branch channels, an independent exhaust-passage connecting each group of secondary pneumatics with its primary pneumatic whereby the primary pneumatic controls the exhaust, a check-valve in said exhaust-passage and a traveling music-sheet having note-playing perforations and note-individualizing perforations to cooperate with the note and individualizing channels of the tracker-board.

9. In a self-playing musical instrument, the combination of a tracker-board having note-channels and a note-individualizing channel, primary pneumatics connected with the note-channels, an individualizing-pneumatic connected with the individualizing-channel, a channel for each primary pneumatic, an accompaniment-channel and an individualizing-channel common to each of any number of primary-pneumatic channels and the connection of which primary-pneumatic channel therewith is governed by the individualizing-pneumatic, two or more secondary pneumatics for each primary pneumatic controlling the operation of sound-producing devices, a branch channel for each secondary pneumatic connecting them with an accompaniment-channel and an individualizing-channel of the same primary pneumatic, a stop-valve for each of said branch channels, independent means for maintaining and continuing the initial operating pressure upon the secondary-pneumatic branches, an automatic cut-off in the accompaniment-channel and an automatic cut-off in the individualizing-channel, an independent exhaust for each secondary pneumatic controlled by a primary pneumatic and a traveling music-sheet having note-playing perforations and note-individualizing perforations to coöperate with the note and individualizing channels of the tracker-board.

10. In a musical instrument of the character specified, the combination of sound-producing devices, a series of groups of two or more secondary pneumatics to govern the operation thereof, an individualizing wind-channel, an accompaniment wind-channel and branches connecting each of said channels with each secondary pneumatic of each group.

11. In a musical instrument of the character specified, the combination of sound-producing devices, a series of groups of two or more secondary pneumatics to govern the operation thereof, an individualizing wind-channel and an accompaniment wind-channel, branches connecting each of said channels with each secondary pneumatic of each group and stop-valves for each set of branches.

12. In a musical instrument of the character specified, the combination of sound-producing devices, a series of groups of two or more secondary pneumatics to govern the operation thereof, an individualizing wind-channel and an accompaniment wind-channel, branches connecting each of said channels with each of said secondary pneumatics of each group and a cut-off in the individualizing wind-channel and a cut-off in the accompaniment wind-channel.

13. In a musical instrument of the character specified, the combination of sound-producing devices, a series of groups of two or more secondary pneumatics to govern the operation thereof, an individualizing wind-channel, an accompaniment wind-channel, branches connecting each of said channels with each secondary pneumatic of each group, an individualizing-wind-channel cut-off, an accompaniment-wind-channel cut-off and a secondary-pneumatic exhaust independent of the wind-channels.

14. In a musical instrument of the character specified, the combination of sound-producing devices, a series of groups of two or more secondary pneumatics to govern the operation thereof, an individualizing wind-channel, an accompaniment wind-channel, branches connecting each of said channels with each secondary pneumatic of each group, an individualizing-wind-channel cut-off, an accompaniment-wind-channel cut-off, a main exhaust-passage, a branch from said passage to each of the secondary pneumatics of a group or the branch channels thereof, and a check-valve for each of said branches.

15. In a musical instrument of the character specified, the combination of sound-producing devices, a series of groups of two or more secondary pneumatics to govern the operation thereof, an individualizing wind-channel, an accompaniment wind-channel, branches connecting each of said channels with each secondary pneumatic of each group, the branch stop-valves, individualizing-wind-channel cut-offs, accompaniment-wind-channel cut-offs and secondary-pneumatic exhaust-passages independent of the wind-channels.

16. In a musical instrument of the character specified, the combination of sound-producing devices, a secondary pneumatic to govern the operation thereof, a wind-channel for communicating thereto an initial pressure and a by or secondary channel connected with the first-named channel to supply continuing wind-pressure thereto and to the secondary pneumatic.

17. In a musical instrument of the character specified, the combination of sound-producing devices, a secondary pneumatic to govern the operation thereof, a wind-channel for communicating thereto an initial pressure, a by or secondary channel connected with the first-named channel to supply continuing wind-pressure thereto and to the secondary pneumatic, a valve movable with the secondary pneumatic to open and close said by or secondary passage.

18. In a musical instrument of the character specified, the combination of sound-producing devices, a secondary pneumatic to govern the operation thereof, a wind-channel for communicating thereto an initial pressure, a by or secondary channel connected with the first-named channel to supply continuing wind-pressure thereto and to the secondary pneumatic, a valve movable with the secondary pneumatic to open said by or secondary passage, a secondary-pneumatic exhaust-passage and means for closing the same and holding it closed during the playing of a note and for opening it at the end of said playing.

19. In a musical instrument of the character specified, the combination of sound-producing devices, a secondary pneumatic to govern the operation thereof, a secondary passage connecting a source of wind-pressure with the pneumatic, a valve operated by the said secondary pneumatic to open and close the secondary passage and an exhaust-passage adapted to be opened to permit the closing movement of the pneumatic and of the valve of the secondary passage.

20. In a musical instrument of the character specified, the combination of sound-producing devices, a series of groups of two or more secondary pneumatics to govern the operation thereof, wind-channels connected therewith adapted to receive operating pressures, a by or secondary channel connecting the source of wind-supply with each of said channels, an independent exhaust-passage from each of said channels, a back-pressure cut-off for each of said channels and for the exhaust-passages, relief-valves for the exhaust-passages and a valve for each of the secondary or by passages movable with the secondary pneumatic to which it delivers pressure.

21. In a musical instrument of the character specified, the combination of automatic means for producing, selecting and separating accompaniment wind impulses for playing accompaniment-notes and individualizing wind impulses for playing individualizing-notes with a group of two or more secondary pneumatics each of which is adapted to be actuated by either of said wind impulses.

22. In a musical instrument of the kind described, the combination of means for producing wind impulses available for either accompaniment or individualizing purposes, further means for selecting and separating said accompaniment and individualizing impulses, two or more sets of secondary pneumatics, the pneumatics of each set actuated at will by either of said selected impulses, one or more keyboards, and means for connecting and disconnecting each from its set of secondary pneumatics as described.

23. In a musical instrument of the kind described, the combination of means for producing wind impulses available for either accompaniment or individualizing purposes, further means for selecting and separating said accompaniment and individualizing impulses, two or more sets of secondary pneumatics, the pneumatics of each set actuated at will by either of said selected impulses, and sound-producing devices connected with said secondary pneumatics to be operated thereby.

24. In a musical instrument adapted to play both individualizing and accompaniment notes, the combination of means for producing wind impulses, two or more sets of secondary pneumatics, means for selecting and separating the aforesaid impulses and to cause either of them to actuate at will the aforesaid pneumatics.

25. In a musical instrument adapted to play both accompaniment and solo notes, the combination with two or more sets of secondary pneumatics of automatic means for producing wind impulses available for either solo or accompaniment purposes, and further means for selecting and separating such solo wind impulses from the accompaniment wind impulses and for causing them to actuate any of said secondary pneumatics.

26. In a musical instrument adapted to play both individualizing and accompaniment notes, the combination with two or more sets of secondary pneumatics of automatic means for producing wind impulses available for either individualizing or accompaniment purposes, further means for selecting and separating the accompaniment wind impulses from such wind impulses, means whereby each secondary pneumatic of each set is actuated by said accompaniment wind impulses at will, and sound-producing devices, the operation whereof is governed by said secondary pneumatics.

27. In a musical instrument adapted to play both accompaniment and solo notes, the combination of two or more sets of secondary pneumatics, automatic means for producing wind impulses available for accompaniment and solo purposes, further means for selecting and separating solo impulses from such wind impulses, means whereby each secondary pneumatic of said sets is actuated by said solo wind impulses at will, and sound-producing devices, the operation whereof is governed by said secondary pneumatics.

28. In a musical instrument of the character specified, the combination of automatic means for producing uniform wind impulses, automatic means for selecting from said uniform impulses impulses for playing solo-notes and also similar impulses for playing accompaniment-notes, automatic means for holding said solo-note wind impulses and accompaniment-note wind impulses separated, sound-producing devices capable of providing solo and accompaniment effects, and interposed means governing the playing of solo and accompaniment notes thereon equally common to both accompaniment wind impulses and solo wind impulses and independently actuated by them.

29. In a musical instrument of the character specified, the combination of automatic means for producing uniform wind impulses, automatic means for selecting from said uniform impulses impulses for playing accompaniment-notes and also similar impulses for playing solo-notes, means for maintaining said impulses separated, a group of two or more secondary pneumatics, and means for operating each pneumatic of each group at will by an accompaniment wind impulse or a solo wind impulse.

30. In a musical instrument of the character specified, the combination of automatic means for producing wind impulses, automatic means for selecting one class of said impulses from another and for maintaining them separated, secondary pneumatics operated at will by either class of impulses and automatic cut-offs for each class of impulses.

31. In a musical instrument of the character specified, the combination of automatic means for producing wind impulses, automatic means for selecting one class of said impulses from another and for maintaining them separated, secondary pneumatics operated at will by either class of impulses with automatic cut-offs for each class of impulses, the cut-offs for one class being actuated by the wind impulses of the other class.

32. In a musical instrument of the character specified, the combination of a channel for accompaniment-note impulses, a channel for solo-note impulses, an automatic cut-off in the accompaniment-note channel connected with the solo-note channel to be actuated by solo-note impulses.

33. In a musical instrument of the character specified, the combination of a channel for solo-note impulses, a channel for accompaniment-note impulses, an automatic cut-off in the solo-note channel connected with the accompaniment-note channel to be actuated by the accompaniment-note impulses.

34. In a musical instrument of the character specified, the combination of a channel for accompaniment-note impulses, a channel for solo-note impulses, an automatic cut-off in the accompaniment-note channel connected with the solo-note channel to be actuated by the solo-note impulses and an automatic cut-off in the solo-note channel connected with the accompaniment-note channel to be actuated by accompaniment-note impulses.

35. In a musical instrument of the character specified, the combination of a tracker-board having note-channels and a note-individualizing channel, primary pneumatics connected with the note-channels, a channel leading from each primary pneumatic, an accompaniment-channel and an individualizing-channel opening from said primary channel and connected therewith by valves, and means for controlling said valves comprising an individualizing-pneumatic connected with the individualizing-channel and with the said valves.

36. In a musical instrument of the character specified, the combination of primary pneumatics, a channel for each primary pneumatic adapted to receive wind impulses, an accompaniment and an individualizing channel connected with the primary-pneumatic channel by valves, a pressure wind-channel common to all the valves of the individualizing-channels, a pressure wind-channel common to all the valves of the accompaniment-channels and automatic means governing the admission of pressure to the two channels and the exhausts therefrom, comprising a pneumatic D', actuated as specified, and the valves D², D³ controlled by said pneumatic.

37. In a musical instrument of the character specified, the combination of two or more manuals, separate sound-producing devices independently operated by each manual and automatic means for playing solo or individualizing notes upon any one or more of the separate sound-producing devices and accompaniment-notes upon the separate sound-producing devices which are not then being operated to play individualizing-notes, said means comprising means for producing wind impulses available for either accompaniment or individualizing purposes, further means for selecting and separating said accompaniment or individualizing impulses, and two or more sets of secondary pneumatics, the pneumatics of each set being adapted to be actuated by either of said selected impulses.

38. In a musical instrument of the character specified a valve-board, ports arranged in pairs therein having openings upon one side of the board closely arranged in relation to each other, channels connected with said ports, flexible diaphragms attached by their edges to the board to cover each pair of openings, a chamber common to a number of diaphragms and automatically-controlled means of the character specified for admitting pressure to said chamber or permitting its release therefrom whereby one class of impulses may be selected from a common source and utilized to operate automatically one or a number of notes to be individualized, as described.

39. In a musical instrument of the character specified, a wind-trunk, a reed-box, an opening between said wind-trunk and said reed-box, a draw-stop valve $h^5$ closing said opening, its operating-pneumatic $h^2$ and a by-passage about the valve closed by pressure upon one side upon the opening of the valve and opened by pressure upon its other side by the closing of the valve.

40. In a musical instrument of the character specified, the combination of the reed-valve having a head provided with a plurality of holes extending from the reed-box to the valve-chamber and arranged about a passage from the valve-chamber to the reed and a flexible diaphragm covering the holes and passage adapted to be closed and held closed to disconnect the plurality of holes and the passage to the reed and upon the release of pressure to permit them to be connected.

41. The combination of the air channels or passages of one organ or manual, the air-passages of a second organ, cross-passages connecting channels of the first organ with channels of the second, valves in said cross-passages for normally closing the same when each organ is played separately, a check-valve in each cross-passage to prevent reverse flow of pressure and individual valves for each channel or passage of the secondary organ individually connected with the cross-passage thereto to be operated therefrom to close said passage or channel upon the playing of its note by the first organ.

42. In an organ, as a means for coupling two organs together either in unison or in octave or any other arrangement, the combination of the pressure channels or passages of the primary or active organ, the pressure channels or passages of the secondary or dependent organ, cross-passages connecting passages of the active organ with passages of the dependent organ, individual check-valves in said cross-passages for preventing the flow of pressure through them from the channels of the dependent organ, means common to all the cross-passages for simultaneously opening or closing them, individual means in the channels of the secondary organ to open or close the same upon the exhaust side of said channels, said means being individually connected with said cross-passages between the universal valves thereof and the check-valves.

43. In combination, two or more sets of secondary pneumatics, pairs of note-separating channels, a group of stops of reeds for each set of secondary pneumatics, each pair of note-separating channels being connectible with one secondary pneumatic of each set and each set of secondary pneumatics being connected with a group of stops of reeds individual to it.

44. The combination of primary pneumatics automatically actuated by the music-sheet, note-separating channels, two or more secondary pneumatics with each of which said channels connect, sound-producing devices controlled as to their action by said secondary pneumatics, manual primary pneumatics operated by keys and connected directly with the secondary pneumatics.

45. The combination of music-sheet-controlled primary pneumatics, two or more secondary pneumatics for each primary pneumatic, note-separating channels between the two manually-controlled primaries connected with the secondaries and means for cutting out the music-sheet primary pneumatics and the exhaust of the secondary pneumatics when operated by said manual primaries and for cutting in the manual primaries.

46. The combination of the music-sheet-controlled primary pneumatics, two or more secondary pneumatics for each of said primary pneumatics, note-separating pressure-channels between the two, manually-controlled primary pneumatics, channels connecting them with the secondary pneumatics, the secondary-pneumatic relief-channels, the diaphragm-valve chambers $D^7$ and $D^8$ and their diaphragms and the valves $D^5$, $D^6$ controlling admission of pressure to and the release of pressure from said passages.

47. The combination of two or more organs, a set of secondary pneumatics for each organ, a music-sheet-controlled primary pneumatic for controlling the operation of a single secondary of each set of secondaries, connectible with either of the two or three secondaries at will, and manually-controlled primary pneumatics, one set for each organ and the set of secondary pneumatics therefor and with which the various sets of manually-controlled primary pneumatics are connectible.

48. The combination of automatically-actuated primary pneumatics, groups of two or more secondary pneumatics for each automatic primary pneumatic, note-separating channels or devices between the two, each of which is connected with each secondary pneumatic of its group, sound-producing devices controlled by the secondary pneumatics, a bank of manually-controlled primary pneumatics for each set of secondary pneumatics, and channels connecting said primary and secondary pneumatics, couplers for connecting any two or more of the manuals or organs and means for stopping off either the self-playing or manually-playing division of the apparatus at will.

49. In a musical instrument of the character specified, the combination of sound-producing devices, series of groups of two or more secondary pneumatics to govern the operation thereof, a primary pneumatic and an individualizing-pneumatic governing the selecting and separation of accompaniment wind impulses and individualizing wind impulses, an accompaniment-channel connected by branches with each of a group of secondary pneumatics, an individualizing-channel connected with each of said secondary pneumatics, extensions from said branches and a manual for each secondary pneumatic, the keys of which are connected with said extensions.

50. In a musical instrument of the character specified, the combination of two or more groups of sound-producing devices, a secondary pneumatic for each sound-producing device adapted to govern or control its operation, automatic means for pneumatically and simultaneously operating the secondary pneumatics of two or more independent sound-producing devices, a manual for each of said sound-producing devices pneumatically connected with the secondary pneumatics thereof, to operate the same, means for coupling any two of the manuals together and devices for connecting the automatic playing means with the secondary pneumatics and disconnecting the manuals therefrom and vice versa.

51. The combination of a group of two or more secondaries, their direct-pressure channels, release-channels extending from them to a common outlet and a check-valve for each release-channel to close said channel against the outlet and against the other release-channels of the group.

52. The combination in an instrument of the character specified, of secondary pneumatics adapted to be controlled by automatically-controlled primary pneumatics, said automatically-controlled primary pneumatics, a manual, its keys and a line of key-controlled primary pneumatics each of which is connectible with a secondary pneumatic.

53. The combination of the reed-box valve, means for actuating it, a by-reed-box relief-passage controlled by a diaphragm-valve, a diaphragm pressure-chamber connected by a passage with the trunk and adapted to be opened and closed by the reed-box valve.

54. The combination of the reed-box, the trunk, a valve for connecting and disconnecting the same, a reed-box relief-passage and a valve for opening and closing the same, automatically opened by pressure from the reed-box and automatically closed and held closed by pressure from the trunk.

55. In a musical instrument of the character specified, for the purpose of automatically selecting from a common source two classes of wind impulses, channels common to both classes of wind impulses, additional channels, one for each class of wind impulses, connected with said first-named channels by suitable ports and valves arranged in line, a pressure-chamber for each line of valves, and means, automatically controlled by the music-sheet, for automatically admitting pressure to or releasing it from said chambers and in alternate order.

56. In a musical instrument, a valve-board, two ports therein having openings upon one side of the board, channels connected with said ports, a flexible diaphragm attached by its edge to the board to cover said openings, a pressure-chamber over the diaphragm, and automatically-controlled means for admitting pressure to said chamber, or permitting its release therefrom.

57. In a musical instrument of the character specified, a valve-board having in one face a shallow recess, two ports in said board having openings closely arranged in relation to each other and within said recess, and a flexible diaphragm larger than said recess and attached over said recess by its edge to the face of the board about said recess as and for the purposes set forth.

OLIVER HILTON ARNO.
JAMES CLARKE HAGEY.

Witnesses:
F. F. RAYMOND, 2d,
J. M. DOLAN.